(12) United States Patent
Seisun et al.

(10) Patent No.: US 9,025,940 B2
(45) Date of Patent: May 5, 2015

(54) MEDIA RECORDING AND PLAYBACK

(75) Inventors: Michele Seisun, Isleworth (GB); Herve Murret-Labarthe, Isleworth (GB); Steven Griffith, Isleworth (GB)

(73) Assignee: British Sky Broadcasting Limited (GB)

( * ) Notice: Subject to any disclaimer, the term of this patent is extended or adjusted under 35 U.S.C. 154(b) by 1515 days.

(21) Appl. No.: 11/915,292

(22) PCT Filed: May 23, 2006

(86) PCT No.: PCT/GB2006/001886
§ 371 (c)(1),
(2), (4) Date: Jul. 7, 2008

(87) PCT Pub. No.: WO2006/125971
PCT Pub. Date: Nov. 30, 2006

(65) Prior Publication Data
US 2009/0087167 A1    Apr. 2, 2009

(30) Foreign Application Priority Data
May 23, 2005    (GB) .................................. 0510521.8

(51) Int. Cl.
*H04L 29/06*    (2006.01)
*H04N 5/76*    (2006.01)
(Continued)

(52) U.S. Cl.
CPC .............. *H04N 5/76* (2013.01); *H04N 21/4755* (2013.01); *H04N 21/4147* (2013.01); *H04N 21/4668* (2013.01); *H04N 21/4532* (2013.01); *H04N 21/482* (2013.01); *H04N 7/17318* (2013.01); *H04N 2005/91342* (2013.01)

(58) Field of Classification Search
CPC . H04N 7/17318; H04N 7/4532; H04N 7/482; H04N 7/487
USPC .......................................................... 386/46
See application file for complete search history.

(56) References Cited

U.S. PATENT DOCUMENTS 6,807,558 B1    10/2004  Hassett et al.
7,603,022 B2 *  10/2009  Putterman et al. ............ 386/291
(Continued)

FOREIGN PATENT DOCUMENTS

CN    1327314 A    12/2001
EP    1161087 A2    12/2001
(Continued)

*Primary Examiner* — Carl Colin
*Assistant Examiner* — Gary Lavelle
(74) *Attorney, Agent, or Firm* — Kilpatrick Townsend & Stockton LLP

(57) ABSTRACT

A media recording device automatically records selected broadcast programs according to categories specified by the user, without requiring the user to specify in advance which programs are to be recorded. The recorded programs are then presented to the user for selection, and the selected programs may be played back immediately or saved for later playback. Each broadcast program may be allocated a priority, and the device may decide which programs to record or delete according to their relative priority. For each broadcast program, a corresponding visibility period may be specified, during which the program can be selected for playback and is not deleted. There may be a delay between the broadcast of the program and the beginning of its visibility period. An expiry time may be specified for each program, after which the program is deleted. There may be a delay between the end of the visibility period and the expiry time.

19 Claims, 3 Drawing Sheets

(51) Int. Cl.
   *H04N 21/475*    (2011.01)
   *H04N 21/4147*   (2011.01)
   *H04N 21/466*    (2011.01)
   *H04N 21/45*     (2011.01)
   *H04N 21/482*    (2011.01)
   *H04N 7/173*     (2011.01)
   *H04N 5/913*     (2006.01)

(56) References Cited

U.S. PATENT DOCUMENTS

| | | | |
|---|---|---|---|
| 7,757,265 B2 * | 7/2010 | Reynolds et al. | 725/144 |
| 2002/0129375 A1 | 9/2002 | Kim et al. | |
| 2002/0144067 A1 | 10/2002 | Jeong | |
| 2002/0174430 A1 | 11/2002 | Ellis et al. | |
| 2003/0088872 A1 * | 5/2003 | Maissel et al. | 725/46 |
| 2004/0004631 A1 * | 1/2004 | Debique et al. | 345/704 |
| 2004/0268410 A1 * | 12/2004 | Barton et al. | 725/119 |
| 2005/0060756 A1 * | 3/2005 | Daniels | 725/134 |
| 2006/0026636 A1 * | 2/2006 | Stark et al. | 725/37 |
| 2006/0212904 A1 * | 9/2006 | Klarfeld et al. | 725/46 |

FOREIGN PATENT DOCUMENTS

| | | |
|---|---|---|
| EP | 1487204 A1 | 12/2004 |
| EP | 1526725 A1 | 4/2005 |
| EP | 1900202 A1 | 3/2008 |
| GB | 2378841 A | 2/2003 |
| JP | 2003173278 A | 6/2003 |
| WO | 01/82599 A1 | 11/2001 |
| WO | 2004/063892 A2 | 7/2004 |
| WO | 2004/082226 A1 | 9/2004 |

* cited by examiner

Fig. 5

| Groups | Week 1 | Week 2 | Week 3 | Week 4 |
|---|---|---|---|---|
| New to Movies | Lord Of The Rings: Return…(P)<br>Lost In Translation (P)<br>Scary Movies (new last week)<br>Taking Lives (P)<br>Garage Days (P) | Pirates Of The Carribean (P)<br>Runaway Jury (P)<br>Welcome To The Jungle (P)<br>Lord Of The Rings: Return…<br>Scary Movie 3 | 50 First Dates (P)<br>Pirates Of The Carribean<br>Connie & Carla (P)<br>Barbershop 2 (P)<br>Welcome To The Jungle | Van Helsing (P)<br>Haunted Mansion (P)<br>50 First Dates<br>Cold Creek Manor (P)<br>Connie & Carla |
| Sky recommends… | Lord Of The Rings: Return…<br>Lost In Translation<br>The Cable Guy<br>The Searchers<br>Chicago | Pirates<br>Runaway Jury<br>Out of Sight<br>Story Of The Weeping Camel (P)<br>The Quiet American | 50 First Dates<br>Connie & Carla<br>Apocalypse Now<br>Runaway Jury<br>Rabbit Proof Fence | Big Fish<br>Cold Creek Manor<br>Matchstick Men<br>Bon Voyage<br>The Hours |
| Golden Oldies | It Happened One Night (new library)<br>The Searchers<br>Superman II<br>The Natural | Dr Strangelove<br>Hello Dolly<br>The Natural<br>Back To The Future | Apocalypse Now<br>Dad's Army<br>Mr Smith Goes To Washington<br>Top Gun | Desert Rats<br>The Misfits<br>Braveheart<br>Mr Smith Goes To Washington |
| Lucky Dip | Lord Of The Rings The Return<br>Bad Boys II<br>Scary Movie 3<br>Lost In Translation<br>The Natural | Pirates<br>Runaway Jury<br>Hello Dolly<br>Out Of Sight<br>Back To The Future | The Core<br>50 First Dates<br>Apocalypse Now<br>Connie & Carla<br>Rabbit Proof Fence | Braveheart<br>Connie & Carla<br>Haunted Mansion<br>Bon Voyage<br>Van Helsing |
| Family Favourites | Jumanji<br>Lord Of The Rings: The Return<br>Superman II<br>Harry Potter (tired - low priority) | Pirates<br>Harry Potter<br>Back To The Future<br>Superman II | Looney Tunes<br>Mrs Doubtfire<br>X Men 2<br>Pirates | Haunted Mansion<br>Mrs Doubtfire<br>Looney Tunes<br>Big Fish |

MEDIA RECORDING AND PLAYBACK

FIELD OF THE INVENTION

This invention relates to an apparatus, method and system for media recording and playback, particularly but not exclusively in a broadcast media system.

BACKGROUND OF THE INVENTION

In conventional Personal Video Recording (PVR) systems, such as the Sky+® system, a broadcast receiver or set-top box (STB) stores a schedule of programmes to be broadcast on different channels and at different times, and presents this schedule to the user in an interactive electronic programme guide (IEPG). The user selects desired programmes or series of programmes, which are then recorded on a local recording medium, such as a hard disc, as they are broadcast. The recorded programmes may then be viewed at a time convenient to the user, and may be stored for repeated viewing or erased automatically after they are viewed. The programmes are broadcast and stored in encrypted form, the decryption process being managed via a smart card. Some programmes may be provided on a 'pay-per-view' basis, so that they may only be viewed if an additional payment has been made and a specific authorisation sent to the STB. A PVR system allows the user to build a collection of desired programmes, by referring to the IEPG and selecting the programmes individually or as a series from the schedule. However, the desired programmes must be available in the schedule and must either have been noticed by the user and specifically selected for recording or be automatically recorded using a 'series link' feature.

In a near Video on Demand (NVOD) system, programmes are broadcast repeatedly at slightly offset times, such as every 15 minutes, on different channels. The user therefore does not need to wait very long for the desired programme to be available. NVOD systems are simple to operate, but costly in terms of bandwidth.

In one type of Video on Demand (VOD) system, a library of programmes is stored at a head-end server. Users select programmes from the library and the selected programmes are streamed or downloaded to the user's STB. Users can therefore select their desired programmes without reference to a schedule. However, the bandwidth requirements of this type of VOD are very high, because a point-to-point connection is established to each user, and the instantaneous bandwidth demands of all users must be met. Consumers can also find too many different items of programming on offer daunting and less attractive than a managed choice or recommended viewing offering.

In a push VOD (P-VOD) system, a library of programmes is downloaded automatically to the user's STB, without requiring the user to pre-select any specific programme. The user may then select which of the downloaded programmes to watch. In an Internet P-VOD system, such as described in U.S. Pat. No. 6,807,558, the library of programmes is downloaded via an Internet connection. In a broadcast P-VOD system, programmes are broadcast at intervals on hidden channels and are selectively recorded by the STB so as to construct the library. Hence, although the programmes are broadcast according to a schedule, the user does not need to be aware of the schedule and is not required to select a specific programme before it is broadcast.

The P-VOD service provider is able to use its expertise and knowledge of the relative qualities of different pieces of programming, studies of viewer behaviour and viewer research in relation to viewing preferences, and specific indications of preference made by the viewer to generate a selection of recommended programmes for any given viewer. The P-VOD supplier therefore wishes to make its preferred selection of programming, based on this expertise and knowledge, available to the viewer.

The P-VOD service provider also wishes to make a larger selection of recommended programming available to the viewer. In order to provide a user friendly and pleasing service, the programming also needs to be presented to the user in an intuitive and predictable manner. For example, the consumer may be confused if programming is made available to view but is then removed from the schedule after an unexpectedly short period of time before they have had an opportunity to view it.

There are several technical obstacles facing the P-VOD service provider in offering a service with these qualities.

Although memory costs are falling and P-VOD systems have been made possible by the comparatively large number of programmes that can be stored on a local storage device, memory resource is still finite. For example, it is possible to store at least 40 hours of standard definition video on a commercially available hard disc. However, this represents only a fraction of the programmes that users might want to watch. In addition, developments such as the implementation of High Definition (HD) programming services increases the amount of memory resource required per unit time of programming. Accordingly, it is necessary to maximise and optimise the use of the available memory resource.

Broadcast PVRs also contain a finite number of tuners, which are required to receive broadcast programming at any given time. Often, PVRs will contain one or two tuners but the number can be greater. Each additional tuner involves extra cost. During 'live' viewing, one tuner is necessarily used by the viewer. This will also be the case if the viewer inadvertently fails to switch off their PVR and the viewing is therefore unattended. In addition, each programme selected for recording at any given time will require dedicated use of a tuner. Tuner conflicts may therefore occur.

There are also finite bandwidth resources to transmit programming. In satellite broadcasting, it may be possible to acquire additional bandwidth at the relevant orbital position but this involves significant cost which may vary depending on supply. Other distribution platforms such as digital terrestrial television (DTT) and cable have similar considerations.

STATEMENT OF THE INVENTION

In one aspect of the invention, a media recording system automatically records selected broadcast programmes according to categories specified by the user, or one or more default categories selected by the service provider, without requiring the user to specify in advance which programmes are to be recorded. Each of the recorded programmes are then presented to the user for selection, during a corresponding visibility period, and the selected programmes may be played back immediately or saved for later playback. Recorded programmes may be deleted after the visibility period, although they can be saved for repeat viewing and kept for longer than the visibility period. Each broadcast programme may be allocated a priority, and the device may decide which programmes to record according to their relative priority. Recorded programmes of low priority may be deleted to allow recording of programmes of higher priority. Preferably, recorded programmes may only be deleted outside their visibility period. Recorded programmes may be deleted automatically after a specified expiry time. There may be a delay between the end of the visibility period and the expiry time.

Scheduling of transmission of the relevant programming may be determined according the priority of the programming and/or the likelihood of a tuner being available at the scheduled broadcast time.

There may be a delay between the successful recording of a programme and the beginning of its visibility period.

In another aspect of the invention, there is provided a method of operating a media recording system, as described above. In another aspect, there is provided a computer programme arranged to carry out the method when executed on the media recording system.

In another aspect of the invention, there is provided a P-VOD broadcasting system which broadcasts information specifying the relative priorities of different programmes, the visibility period of each programme, and/or the expiry time of each programme.

BRIEF DESCRIPTION OF THE DRAWINGS

Specific embodiments of the present invention will now be described with reference to the accompanying drawings, in which:

FIG. 5 is a diagram of a sample broadcast schedule in the embodiment.

DETAILED DESCRIPTION OF EMBODIMENTS OF THE INVENTION

In an embodiment of the present invention, a broadcast P-VOD system is provided as an additional service to a broadcast PVR system with an IEPG, so that a single STB provides access to both P-VOD and PVR content. The STB includes a hard disc which is partitioned into at least two quotas or sectors: one which the user can use and manage according to the existing PVR functionality available to them ('user managed sector') and another which is managed by the service provider rather than by the user ('P-VOD sector'). In other words, one quota or sector is used to store content items pre-selected by the user prior to broadcast (either individually or as a series), while the other quota or sector is used to store content items automatically selected by the STB.

In the case of a hard disk, preferably, this partition is logical rather than physical i.e. it is implemented by the file management system. Such a logical partition gives the service provider greater flexibility for subsequent changes to receivers already installed at users' homes. The STB records selected P-VOD content onto the P-VOD sector, via a real-time recording process. The STB provides selective access to the loaded P-VOD content via an 'on demand' service menu, which may be separate from the existing PVR service menu. For example, the available P-VOD programmes may be listed alongside traditional near video on demand (NVOD) services.

Broadcast PVOD System

Figure 1:
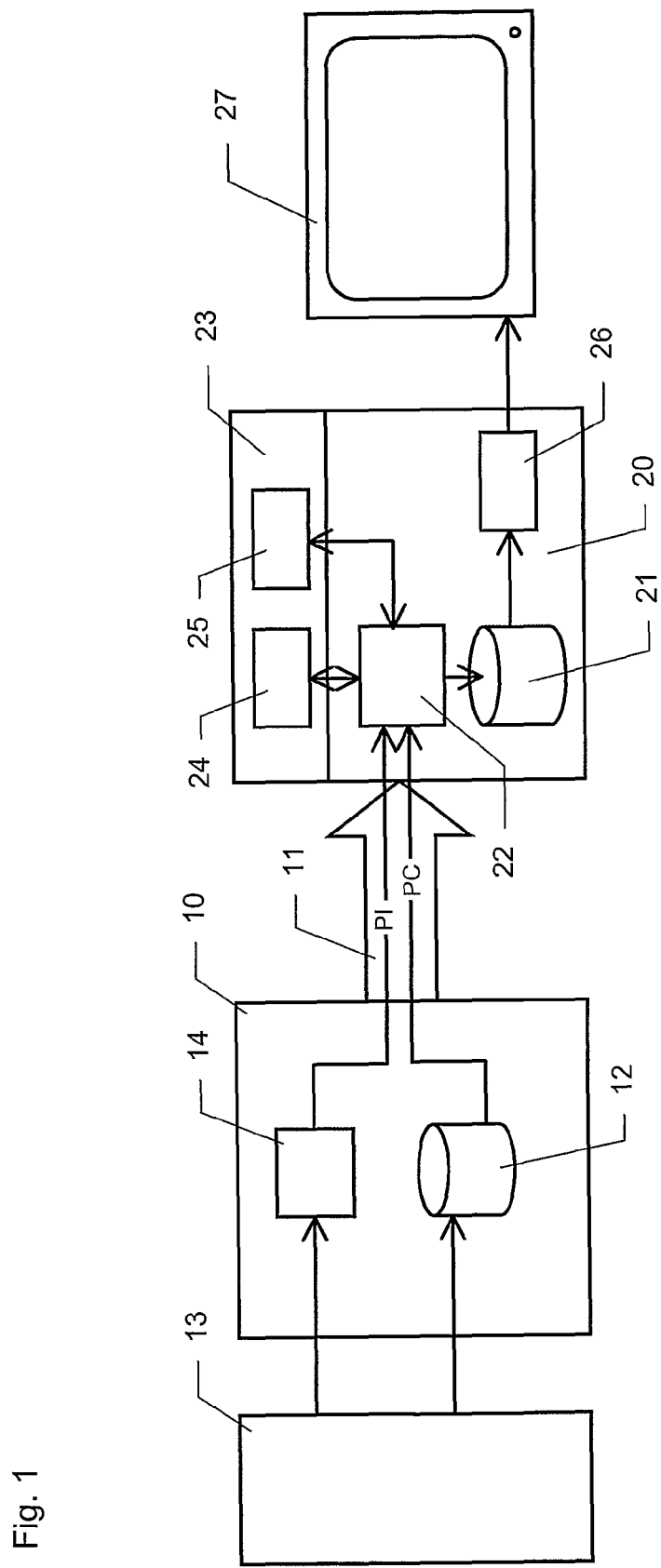
FIG. 1 is a diagram of a broadcast P-VOD system in an embodiment of the invention.

FIG. 1 shows functional features of the P-VOD broadcast system in an embodiment of the invention. A broadcast head end 10 provides broadcast content over a broadcast stream 11 to a plurality of STBs 20, only one of which is shown in FIG. 1. The head end 10 includes a content scheduler 12 which stores content items, such as audio and/or video programmes, and outputs the content items to be broadcast in the broadcast stream 11 according to a schedule. A traffic system 13 generates a broadcast schedule that determines in which channel(s) and at what time(s) each content item is to be broadcast. The broadcast schedule is transmitted to the head end 10 so as to control the broadcast channel(s) and time(s) at which each of the content items in the content scheduler 12 are broadcast in the broadcast stream 11.

The content items include push content items PC which are broadcast in dedicated push content channels in the broadcast stream 11. Preferably, the broadcast of each push content item PC is repeated at intervals to ensure that it can be received by each of the STBs. The head end 10 includes a push content information interface 14 which receives push content information from the traffic system 13 and outputs the push content information PI in the broadcast stream 11.

The STB 20 receives the broadcast content items, including the push content items PC, and push content information PI from the broadcast stream 11. The STB 20 includes a hard disc 21, preferably partitioned as described above, and a push content manager 22 which selects which of the received push content items PC to record on the P-VOD sector. The STB 20 includes a user interface 23 including a push content preference menu 24 through which the user sets push content preference settings.

The user interface 23 also includes a content playback function 25 that lists content items stored on the hard disc 21, and allows the user to select listed content items for playback from the hard disc 21. For example, selected content items may be output from the hard disc 21 to an audiovisual display 27 via a suitable interface 26.

Push Content Information

The push content information PI includes a list of currently available push content groups, which indicate the type of content of push content items PC. For example, available push content groups may include 'Western Movies', 'High Definition Movies' or 'Premiere Showing'. The list is received by the STB 20 and displayed by the preference menu 24 for selection by the user. The groups may include a default group which is automatically selected by the STB 20 prior to any group selection by the user. The default group may be deselected when the user makes a group selection, so that the default selection is replaced by the user's group selection. Alternatively, the default group may be permanently selected by the STB 20 and cannot be deselected by the user, to ensure that push content items PC within the default group are always available for selection.

The push content information PI also specifies, for each push content item PC:

i) an associated one or more of the groups;
ii) a unique reference, which is repeated every time that content item is broadcast, to allow the STB 20 to recognise whether it has already recorded that content item;
iii) a priority rating to allow the STB 20 to prioritize between different content items when selecting which content items to record and/or delete;
iv) content lifecycle information (as explained below);
v) a schedule of future broadcasts for that item, indicating when and on what channel(s) the content item will be rebroadcast; and
vi) a save flag indicating whether that content item can be saved for repeat viewing.

The push content manager 22 selects which of the push content items PC to record, on the basis of the push content information PI and one or more predetermined rules. For example, only content items belonging to groups selected by the user may be recorded. Alternatively, if no groups have been selected by the user, a default group or one of a number of default groups may be recorded. A content item cannot be recorded if a content item carrying the same unique reference has already been recorded.

The push content manager 22 also deletes or marks as available for deletion selected push content items PC already recorded in the P-VOD sector, so as to make storage space available for other push content items.

Examples are given below of other rules by which the push content manager 22 records and deletes push content items.

Lifecycle Management

Figure 2:
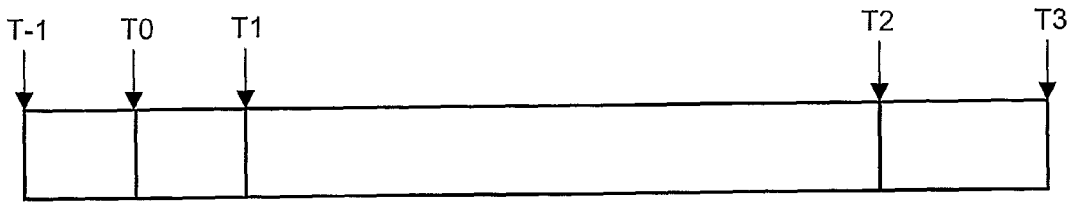
FIG. 2 is a diagram of a lifecycle of a push content item in the embodiment.

Each push content item PC has associated content lifecycle information within the push content information PI. With reference to FIG. 2, the push content item PC is first broadcast from time T-1 and is successfully recorded at time T0. Times T-1 and T0 are preferably not contained within the push content information PI. For example, T-1 may be determined by the broadcast schedule for that content item at the head end 10. T0 may be the end of the first broadcast of that content item, provided that the first broadcast is successfully recorded by the STB 20; otherwise, it may be the time at which a subsequent broadcast of the content item is recorded.

The lifecycle information determines one or more of:
 i) a time T1 after which the content item is visible to be selected for playback by playback function 25;
 ii) a time T2 after which the content item becomes eligible for deletion when storage capacity is required for a new content item;
 iii) a time T3 after which the content item is automatically deleted.

The time period T-1 to T1 provides a 'cache window' during which the push content item PC is broadcast and may be stored, but cannot yet be selected for playback. The part of the 'cache window' between T0 and T1 is optional and need not be provided for some content items, in which case T1 may be equal to T0. However, the 'cache window' provides the following advantages:
 i) when the P-VOD service is first launched, the cache window allows some time for the P-VOD sector to be populated with push content items PC before the official launch date.
 ii) When a particular push content item PC is being publicized as available from a certain time (which may be a specified date), the push content item PC may often be broadcast before that time, but with T1 set to the publicized time, so that by selection of appropriate priority, scheduling and number of transmissions, there is a high chance that the push content item PC will be available to all users by the publicized time.
 iii) Low priority items may be recorded but kept unavailable within the cache window, to give an opportunity to be replaced by an item of higher priority before the low priority item becomes visible. This enables optimal use of storage capacity, tuner availability and bandwidth to ensure that if a tuner is not available to record a later scheduled transmission of a higher priority content item, the user is still presented with a relevant and compelling content item, albeit of lower priority.

The time period T1 to T2 provides a 'visibility window' during which successfully recorded push content items PC are displayed and can be selected for playback. Preferably, a content item cannot be deleted during its visibility window, regardless of its priority; this ensures that the content item is continuously available for selection during its visibility window.

The time period T2 to T3 provides a soft 'expiry window' during which the content item is no longer broadcast, and may be replaced by content items of higher priority, but will not automatically be deleted. The expiry window allows a soft content expiry and replacement mechanism. For example, the user may select a push content item PC during the visibility window to be saved for later viewing during the expiry window. Alternatively or additionally, the push content item PC may still be displayed as available for playback during the expiry window, if it has not been deleted. Such soft content expiry is advantageous because the user is not unnecessarily presented with an incomplete menu of content items due to rigid automatic deletion before tuner resource is available to record the next content item determined by the content manager 22 for recording. In practice, it is likely that the majority of content item deletion will take place between T2 and T3 and there will be few cases of automatic deletion at T3. However, enforced deletion after time T3 may be required to satisfy the rights licensor that the content item will not be available outside the relevant licensed window.

Priority

Push content items are always accorded lower recording priority than pre-selected recordings initiated by the user for storage in the user managed sector. For example, where the STB 20 is a broadcast receiver having one or more tuners, each tuner is preferentially assigned to receive user-initiated recordings or viewings. Thus, in the case of a broadcast receiver having two tuners, it is likely that only one tuner will normally be available for receiving push content, as the other tuner will usually be assigned to a 'live' channel or to receive a user-initiated recording. The number of tuners may be greater than two but whatever the number of tuners, they increase unit cost and the management of tuner resource is therefore important. In a two-tuner PVR, while the user wishes to watch one channel and record another, no tuners will be available to receive push content. Similarly, if the user has selected two programmes to be recorded simultaneously, no tuners will be available for recording.

The priority rating contained in the push content information PI is used to prioritize recordings. In one example, if two or more push content items belonging to a group selected by the user are broadcast at overlapping times, and the STB 20 is not able to record all of those push content items at the same time, it will record only the item(s) having the highest priority rating. In another example, if the P-VOD sector is full and a new push content item is to be recorded, a recorded push content item may be deleted if it has a lower priority rating than the new push content item, assuming the lower priority item is not in the visibility window between T1 and T2. A recorded push content item may only be deleted if it is either within the cache window (T-1 to T1) or in the soft expiry window (T2 to T3), and must be deleted after T3. These priority rules allow selection between different push content items when subject to recording or storage constraints.

Figure 3:
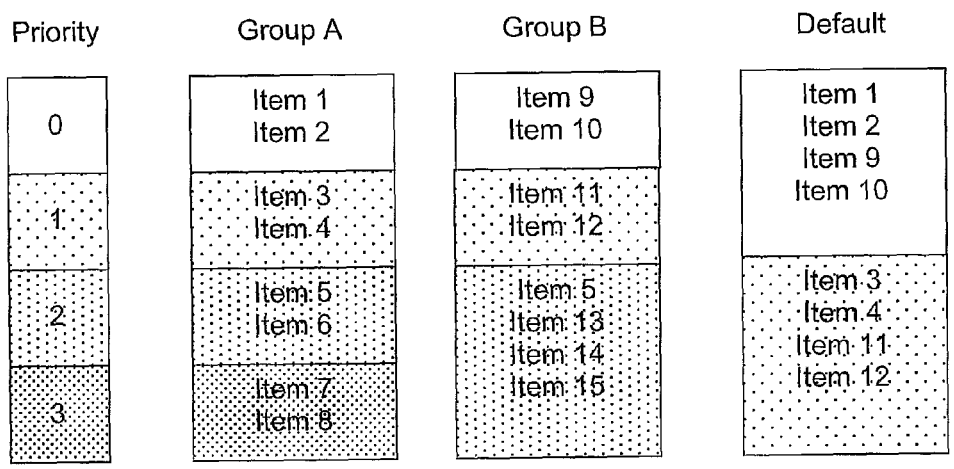
FIG. 3 is a diagram of a priority scheme for different push content items in the embodiment.

In a specific embodiment shown in FIG. 3, priority ratings of 0 to 3 (high to low) are used. Groups A and B each contain content items of some or all of the possible priority levels. A Default group may contain only high priority (0 or 1) items. The operator of the P-VOD system can determine the priority ratings for each item within each group, so as to achieve a desired behaviour by the push content manager 22.

Figure 4:
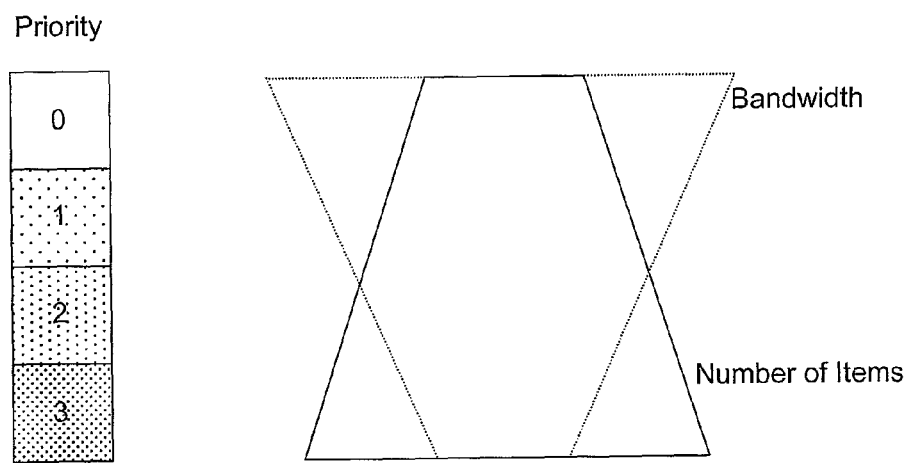
FIG. 4 is a diagram of a priority-based broadcast scheme in the embodiment.

FIG. 4 shows a specific example of a broadcast strategy designed to increase the likelihood of high-priority content being recorded. The number of push content items currently broadcast within each priority rating increases with lower priority. In other words, there are fewer high priority content items than lower priority content items. However, more bandwidth is available in the broadcast stream 11 for higher priority items than for lower priority items. For example, higher priority items may be broadcast more frequently than lower priority items.

Scheduling

FIG. 5 shows an illustrative broadcast schedule of push content items, divided by week and group. The shading shows the relative priority assigned to the each content item for the corresponding week and group, with lower priority items being shaded more heavily. Each push content item may be transmitted more than once each week, subject to bandwidth constraints.

In order to maximise the chance of content items having tuner resource available to make a recording, the transmission of content items is scheduled according to known or anticipated availability of tuners. For example, generally, it is expected that tuners are more likely to be available between 1 am and 5 am in the morning. Conversely, it is expected that tuners are less likely to be available during primetime between 8 pm and 10 pm in the evening. Accordingly, high priority content items are scheduled to be broadcast at times when the tuners are more likely to be available.

Where the STB 20 has the ability to transmit information to the head-end 10, for example by a dial-up or broadband modem connection, the STB 20 may store information relating to the times of availability of its tuners, and relay this information to the head-end 10, so that statistical information on the times of availability of tuners is compiled, and used to schedule high-priority push content items so as to coincide with times of high availability of tuners.

Automatic Termination of Unattended Viewing

In an embodiment of the system, if a user has not interacted with their STB 20 for a certain period of time (such as 90 minutes), after a given time of day (such as 1 am) an on-screen display may be presented asking the user to confirm that they are still watching TV. If there is no response after a period, such as 2 minutes, the STB 20 will be put in standby, thereby freeing for P-VOD recording a tuner previously used for live viewing.

Save Push Content

By default, a push content item is deleted from the P-VOD sector once it has reached its expiry date, i.e. after T3. This programming will however normally have been replaced during the period T2-T3 by the soft deletion process described above. However, if the save flag is set for a specific push content item, the user may select that item to be saved at any time during its visibility period, or after time T2 if the item has not yet been deleted. The selected item is then transferred from the P-VOD sector to the user managed sector and can be viewed using the content playback function 25, even after the period T2-T3, subject to any other viewing restrictions.

Alternative Embodiments

The embodiments are described above purely by way of example, and variations may occur to the skilled person on reading the description, which nevertheless fall within the scope of the invention as defined by the claims.

The invention claimed is:

1. Apparatus for selectively recording and playing back broadcast media content items, comprising:
   a. a push content manager that receives media content information relating to the media content items;
   b. non-transitory data storage that receives and records from a broadcast stream ones of the media content items selected by the push content manager on the basis of the media content information; and that deletes recorded ones of the media content items, selected by the push content manager on the basis of the media content information;
   c. a user interface that provides a list of recorded media content items to a user and that receives a user selection of the indicated media content items for playback by the push content manager; and
   wherein the media content information includes soft and hard expiry times corresponding to the media content items, wherein for each of said media content items the hard expiry time is later than the soft expiry time, and wherein the non-transitory data storage is arranged to prevent deletion of the recorded media content items before the corresponding soft expiry times, and to enforce deletion of the recorded media content items after the corresponding hard expiry times.

2. Apparatus according to claim 1, wherein the media content information indicates availability periods corresponding to the media content items.

3. Apparatus according to claim 2, wherein the user interface is arranged to indicate media content items only within their corresponding availability periods.

4. Apparatus according to claim 2, wherein the data storage is arranged to prevent deletion of media content items within their corresponding availability periods.

5. Apparatus according to claim 2, wherein the user interface is configured to play back said selected one or more media content items after their corresponding availability periods.

6. Apparatus according to claim 1, wherein the media content information indicates a relative priority between different ones of said media content items.

7. Apparatus according to claim 6, wherein the data storage is arranged to select said ones of the media content items on the basis of the relative priority.

8. Apparatus according to claim 6, wherein the data storage is arranged to delete ones of the media content items having lower priority than ones of the media content items selected for recording.

9. Apparatus according to claim 1, wherein the data storage is arranged to delete selected ones of said media content items according to a storage capacity constraint.

10. Apparatus according to claim 1, wherein the media content information indicates one or more categories corresponding to each of said media content items, the data storage being arranged to record selected ones of the media content items on the basis of said one or more categories.

11. Apparatus according to claim 10, wherein the user interface is configured to receive user category preferences from a user, the data storage being arranged to record selected ones of the media content items on the basis of said user category preferences.

12. Apparatus according to claim 11, wherein said categories include a default category, the data storage being arranged to record selected ones of the media content items belonging to the default category independently of said user category preferences.

13. Apparatus according to claim 1, wherein said media content information includes media content identification information uniquely identifying said media content items, the data storage being arranged to record only ones of said media content items which the media content identification information indicates are not already recorded.

14. Apparatus according to claim 1, wherein the user selection includes an indication that the selected one or more of the media content items are to be saved for subsequent playback, such that the data storage is inhibited from deleting the saved one or more media content items.

15. Apparatus according to claim 14, wherein the media content information includes an indication as to which of the media content items are not permitted to be saved, such that the user is prevented from saving those indicated media content items.

16. Apparatus according to claim 1, wherein the media content information is received from the broadcast stream.

17. Apparatus according to claim 1, including a plurality of receiver resources for receiving said broadcast stream, wherein the push content manager is configured to play live content from the broadcast stream substantially as it is received, the apparatus being arranged to allocate at least one of the receiver resources to the push content manager in preference to recording by the recording means.

18. Apparatus according to claim 17, wherein the push content manager is configured to detect whether the user is attending to the live content, and is configured to reallocate the at least one of the receiver resources to the data storage if the user is detected to not be attending to the live content.

19. A method of selectively recording and playing back broadcast media content items, comprising:
   a. receiving media content information relating to the media content items;
   b. selectively receiving and recording from a broadcast stream ones of the media content items, selected on the basis of the media content information;
   c. indicating recorded media content items to a user and receiving a user selection of the indicated media content items; and playing back said user-selected media content item or items;
   wherein the media content information includes a soft expiry time and a hard expiry time corresponding to a recorded one of the media content items, wherein for each of said media content items the hard expiry time is later than the soft expiry time, and wherein deletion of the corresponding media content item is prevented before the soft expiry time, and is enforced after the hard expiry time.

* * * * *